ANTISEPTIC DISPENSING ATTACHMENT FOR TELEPHONES

Filed May 3, 1955

INVENTOR.
Robert T. Hodges,
BY
McMorrow, Berman + Davidson
ATTORNEYS

United States Patent Office 2,840,649

Patented June 24, 1958

2,840,649

ANTISEPTIC DISPENSING ATTACHMENT FOR TELEPHONES

Robert T. Hodges, Fort Lauderdale, Fla.

Application May 3, 1955, Serial No. 505,640

4 Claims. (Cl. 179—185)

The invention relates to telephone attachments, and more particularly has reference to an attachment designed to protect the health of a user of a telephone, by reason of its adaptability for disinfecting the telephone mouthpiece before or after each use thereof.

Particularly in the case of a telephone used by a number of different persons, the telephone instrument may be reasonably considered to be a significant factor in the spreading of illness, particularly respiratory infections such as a common cold. During the use of a telephone, one naturally tends to hold his or her face close to the mouthpiece, and by breathing upon the mouthpiece, may deposit thereon invisible flecks of sputum or saliva containing quantities of an infectious virus sufficient to cause the transmission of the respiratory infection to the next user of the telephone particularly if said next user makes use of the telephone immediately after the use thereof by the other user.

The main object of the present invention, in view of the above, is to provide an attachment for a conventional telephone instrument, which will be provided with a spray nozzle, so designed as to permit a user of the telephone to apply, before said use, a fine mist containing a germicidal or antiseptic agent, directly to the mouthpiece, so as to destroy any infection-causing viruses or the like upon the mouthpiece. Similarly, for the benefit of subsequent users, one may apply the spray to the mouthpiece immediately following his use of the instrument.

A more specific object of the invention is to provide a device of the character referred to which can be attached to a conventional telephone with maximum ease and facility, in such a manner as not to affect adversely the normal use of the telephone in any way, and in such a manner, further, as not to require modification or redesign of the instrument.

A further object of importance is to provide an attachment as described which will be designed to hold a substantial quantity of a antiseptic liquid, this to impart the characteristic of long use to the attachment without requiring replacement thereof.

Another object, in at least one form of the invention, is to provide a device as described which will be particularly adapted to permit refilling of the liquid-confining body portion of the device, thus to permit use of the device over an indefinite period without requiring more than relatively infrequent fillings of the same.

Another object, in said modified form is to provide a novel valve assembly, which will cause a fine mist to be sprayed over the entire mouthpiece area without requirement of maintaining the liquid confined in the body portion under pressure.

Other objects will appear from the following description, the claims appended thereto, and from the annexed drawing, in which like reference characters designate like parts throughout the several views, and wherein:

Figure 1:
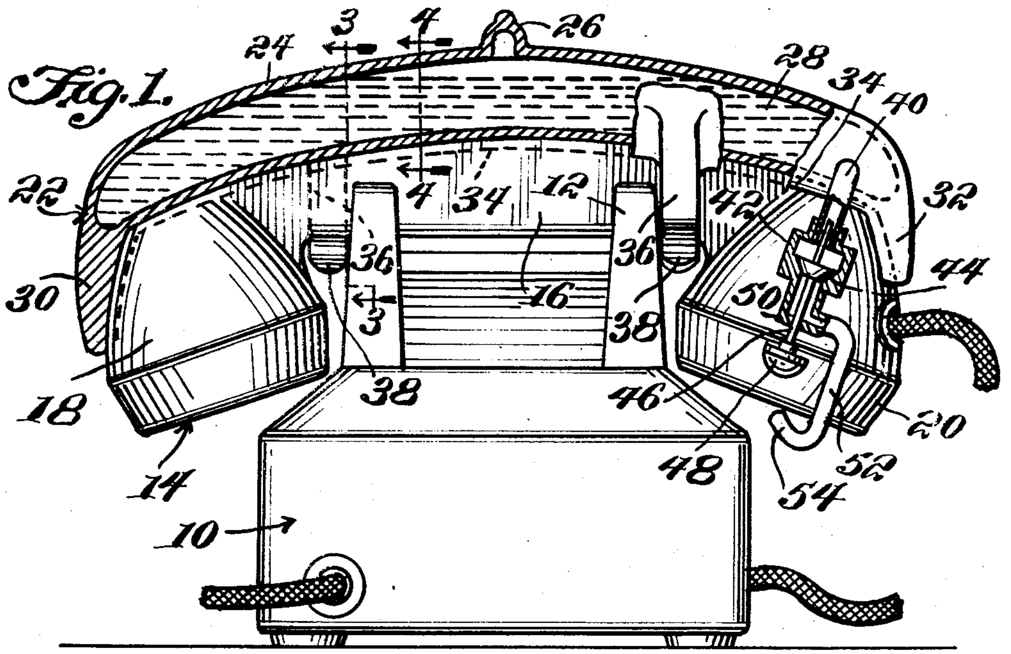
Figure 1 is a rear elevation view of a conventional telephone instrument of the "French" type, a telephone attachment formed according to the present invention being illustrated on said instrument and being shown partly in side elevation and partly in longitudinal section.

At 10 I have generally designated a conventional telephone instrument base having the usual cradle 12 in which is removably supported a combined receiver-transmitter generally designated 14 having an elongated body 16 terminating at its opposite ends in an earpiece or receiver 18, and a mouthpiece or transmitter 20.

The disinfecting attachment constituting the present invention, generally designated at 22, includes an elongated, longitudinally curved, hollow container 24 shaped to extend in longitudinal contact with the back or top surface of body 16, and substantially coextensive in length with the body. Intermediate its ends container 24 has a filling nipple 26 which is initially open to permit the filling of the container with an antiseptic liquid 28 under pressure, after which the nipple 26 is heat-sealed to maintain the pressure within the container against the liquid.

Integrally formed upon and depending from the opposite ends of the longitudinally curved container 24 are depending, downwardly tapering, relatively wide ears 30, 32 having curved inner surfaces complementing the correspondingly curved surfaces of the side walls of earpiece 18 and mouthpiece 20, thus to hold the container 24 against movement longitudinally of the receiver-transmitter 14 from its proper position in which it is substantially coterminous with the receiver-transmitter.

Integrally formed upon container 24, and extending from end to end thereof, are depending longitudinal ribs 34 (Figures 1 and 4) formed upon the opposite side wall of container 24, at the juncture between said side walls and the bottom wall of the container. Ribs 34 straddle body 16, so as to aid in holding the container 24 against movement relative to the body, the ribs being particularly adapted to hold the container against transverse movement.

Integrally formed upon the opposite sides of the container 24 are pairs of depending spring arms 36 (Figures 1 and 3), the arms of each pair being aligned transversely of container 24, the pairs being spaced apart longitudinally of the container and being disposed adjacent the earpiece and mouthpiece, when the device is applied to the telephone instrument. Arms 36, at their lower ends are formed with C-shaped spring clips 38 adapted to resiliently and yieldably engage under body 16, to clamp the container 24 to the body.

Connected in communication at one end with one end of the container 24 is an outlet tube 40, terminating at its outer end in communication with a cylindrical valve housing 42 having therein a tapered valve seat against which a complementarily tapered valve disc 44 is normally held in seated position by the pressure within the container. Fixed to the disc 44 is a plunger 46 terminating at its outer end in a button 48 spaced laterally, outwardly from the transmitter or mouthpiece 20 a short distance, so as to be conveniently disposed for depression by a user. Plunger 46 is slidable in one leg of an L-shaped discharge conduit 50, integral at its outer end with a depending extension 52 which in turn merges into a nozzle 54 projecting radially, inwardly of the mouthpiece and closely overlying the peripheral portion of the mouthpiece. The nozzle is so perforated as to cause a fine mist or spray to be dispersed in a circular pattern, corresponding generally in diameter to that of the mouthpiece, thus to cause the perforated end wall of the mouthpiece to be disinfected over its entire area responsive to depression of the button 48.

Figures 2, 3, 4, 5:
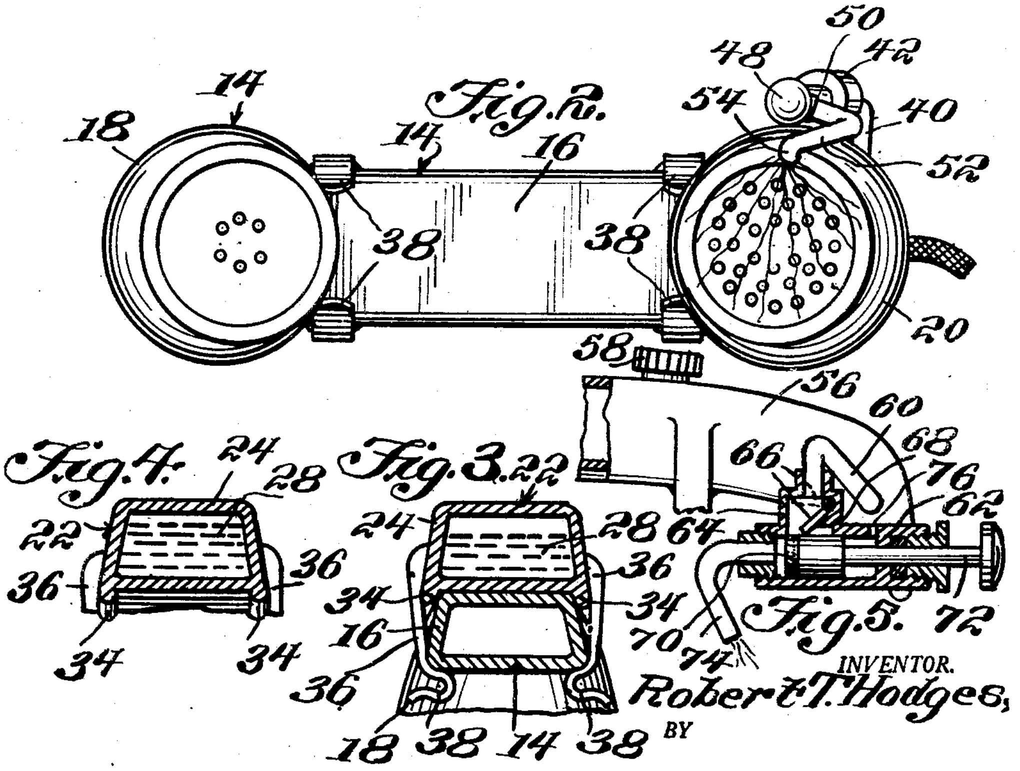
Figure 2 is a bottom plan view of the combined receiver-transmitter of the instrument with the device secured thereto.
Figure 3 is a transverse sectional view on line 3—3 of Figure 1, the instrument base being omitted.
Figure 4 is a transverse sectional view on line 4—4 of Figure 1, the receiver-transmitter being omitted.
Figure 5 is a view partly in longitudinal section and partly in side elevation showing one end portion of a modified form of the attachment.

In the modified form of Figure 5, the container 56 is shaped similarly to container 24, and is secured to the receiver-transmitter in the same manner as the container 24. In this form however, the liquid antiseptic confined within the container is not under pressure, and is simply poured into the container through a filler opening normally closed by a removable filler cap 58. In other words, the container 56 can be refilled with a quantity of antiseptic whenever it is exhausted.

In this form of the invention, the valve assembly includes an outlet tube 60 connected in communication at one end with the interior of the container 56, and connected at its outlet end in communication with a cylindrical plunger or piston housing 62 integrally formed adjacent one end with a laterally projecting check valve housing 64 into which the tube 60 opens. Mounted for free swinging movement between the full and dotted line positions of Figure 5 is a flap check valve 66, said check valve normally swinging to an open position shown in full lines in Figure 5, in which position it lies in a plane oblique to the axis of plunger housing 62, the check valve being supported in the latter position by an internal shoulder 68 integrally formed upon the wall of housing 64.

In its dotted line position, the valve 66 closes the outlet of the tube 60.

Reciprocable within housing 62 is a piston 70, secured to a piston or stem 72 slidably mounted in one end of housing 62 and projecting out of the housing. The projecting end of the rod 72 has a button to permit the piston to be shifted between the opposite ends of the housing by a user.

Connected in communication with the other end of the housing 62 is an outlet conduit 74, which would terminate in a nozzle similar to that shown at 54 for spraying the mouthpiece with antiseptic.

In this form of the invention, the check valve will open to permit the liquid to flow into the plunger housing 62, in advance of the piston 70, whenever the piston is retracted from the normal position thereof shown in Figure 5. To permit free reciprocation of the piston, the housing 62 is provided with a vent 76 in back of the piston communicating the portion of the housing in back of the piston with atmosphere. The piston is of a length to prevent flow of the liquid into this portion, in any position of the piston.

The liquid will be sucked into the housing 62 when the piston is retracted, that is, shifted to the right in Figure 5.

With the liquid disposed in front of the piston in a predetermined, measured quantity, the user immediately after retracting the piston, depresses the button 72, to shift the piston to the left in Figure 5. This places pressure against the check valve, causing the check valve to shift to its closed position as the piston moves forward. As a result, the liquid within the housing 62, now trapped, is forced through the outlet tube 74 and out of the nozzle.

Should the liquid not flow freely into the housing 62, due to a partial vacuum being caused in the container 56 after continued use of the device, the cap 58 can be temporarily loosened to permit an inflow of air into the chamber 56 for the purpose of eliminating the vacuum.

In both forms of the invention, it will be seen that the device is shaped to fit snugly against the "French" type combination receiver-transmitter, so as not to interfere with normal use of the telephone. Further, the device does not require modification or redesign of the telephone instrument in any way, and can be swiftly attached to or detached from said instrument whenever desired.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. An antiseptic-dispensing attachment for a telephone hand set having an elongated body, a receiver at one end of the body, and a mouthpiece at the other end of the body, comprising an elongated container substantially coextensive in length with said body and extending in longitudinally contacting relation with the body, depending ears on the ends of said container engageable with the receiver and mouthpiece, respectively, to limit longitudinal movement of the container on the body, clip means on the container formed and arranged to detachably connect the same to the body, said container being adapted to hold a quantity of an antiseptic liquid, a discharge conduit connected in communication at one end with the container and terminating at its other end in a nozzle formed and arranged to discharge a quantity of said liquid against the mouthpiece of the hand set, and means associated with the conduit formed and arranged to control the flow of liquid therethrough.

2. An antiseptic-dispensing attachment for a telephone hand set including a combined receiver-transmitter having an elongated body, a receiver at one end of the body, and a mouthpiece at the other end of the body, said body having at least one of its longitudinal walls curved from end to end thereof, said attachment comprising an elongated, hollow, container curved complementarily to the body and substantially coextensive in length therewith, depending ears on the ends of said container engageable with the receiver and mouthpiece, respectively, to limit longitudinal movement of the container on the body, said container being formed and arranged to be mounted in longitudinally contacting relation to the body, clip means carried by the container and being formed and arranged to detachably engage the body, a discharge conduit connected in communication with the container and terminating in a nozzle formed and arranged to discharge a quantity of liquid against the mouthpiece, and means formed and arranged to effect a flow of said liquid through the conduit out of the nozzle.

3. An antiseptic-dispensing attachment for a telephone hand set of the type including an elongated body terminating at one end in a mouthpiece and at the other end in a receiver, said attachment comprising an elongated container substantially coextensive in length with said body and adapted to hold a quantity of an antiseptic liquid, depending ears on the ends of said container engageable with the receiver and mouthpiece, respectively, to limit longitudinal movement of the container on the body, pairs of arms spaced longitudinally on said container and depending from the container, the arms of each pair being aligned transversely of the container and terminating at their lower, free ends in clips engageable under the body of the hand set and formed and arranged to detachably connect the container to said body, and means associated with the container including a nozzle formed and arranged to direct a quantity of said liquid against the mouthpiece.

4. An antiseptic-dispensing attachment for a telephone hand set of the type including a combined receiver-transmitter having an elongated body terminating at one end in a mouthpiece and at the other end in a receiver, said attachment comprising an elongated container formed and arranged to be mounted in longitudinally contacting relation with said body and being hollowly formed from end to end thereof for holding a quantity of an antiseptic liquid, depending ears on the ends of said container engageable with the receiver and mouthpiece, respectively, to limit longitudinal movement of the container on the body, longitudinal ribs formed upon said container at opposite sides thereof and being formed and arranged to embrace opposite sides of the hand set body, depending clips formed upon said container at locations spaced longitudinally thereof, said clips being arranged in pairs with the clips of each pair being aligned transversely of the container, the clips being formed and arranged to embrace the hand set body between them and terminating in inwardly directed projections engageable against the underside of the body to hold the container assembled with the body, and means at one end of the container formed and arranged to discharge a quantity of the liquid confined therein against said mouthpiece.

References Cited in the file of this patent

UNITED STATES PATENTS

| | | |
|---|---|---|
| 947,966 | Evans | Feb. 1, 1910 |
| 1,095,950 | Adams et al. | May 5, 1914 |
| 1,513,768 | Stowell | Nov. 4, 1924 |
| 2,181,421 | Fahr et al. | Nov. 28, 1939 |

FOREIGN PATENTS

| | | |
|---|---|---|
| 266,528 | Germany | Oct. 28, 1913 |